Jan. 9, 1934.    J. DE LA TORRE    1,943,165
FILTERING ELEMENT
Filed July 29, 1932
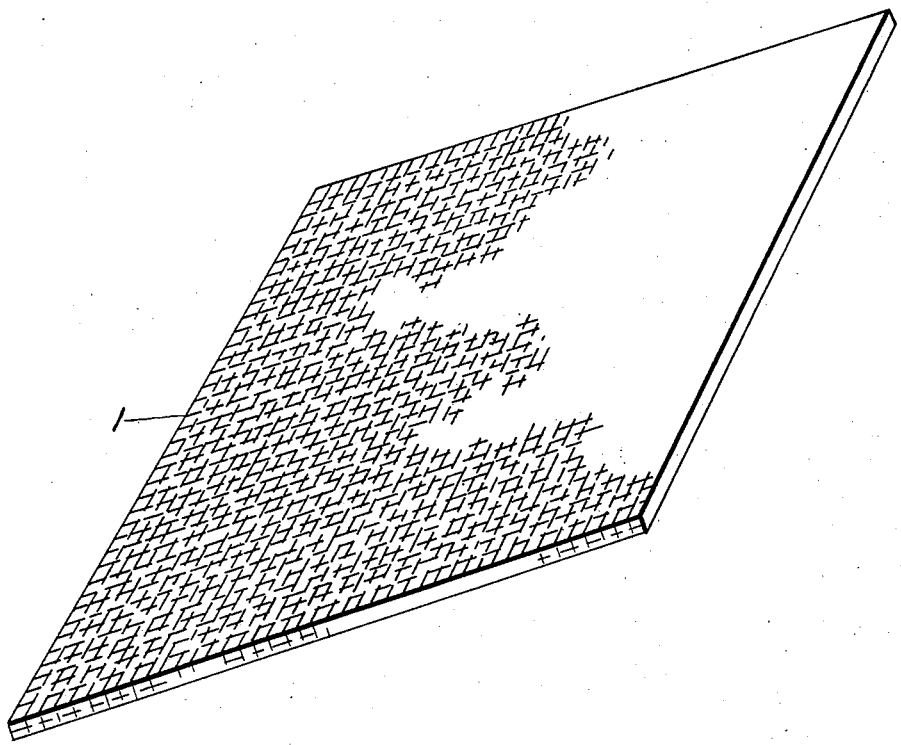
Inventor
Jesus De La Torre
By Geo. P. Kimmel
Attorney Patented Jan. 9, 1934

1,943,165

UNITED STATES PATENT OFFICE 1,943,165

FILTERING ELEMENT

Jesus de la Torre, Mexico, Mexico, assignor to J. De La Torre E. Hijo, of Mexico City Application July 29, 1932, Serial No. 626,186 and in Mexico April 21, 1932

3 Claims. (Cl. 210—204)

This invention relates to a filtering element for use in connection with industrial filtering of all kinds, and has for its object to provide, in a manner as hereinafter set forth, an element of such class formed from a thoroughly degreased textile fabric, such as thick cotton duck or canvas, and which provides a filtering medium possessing perfectly permeable and filtering characteristics, as well as further possessing the quality of quickly and easily absorbing the liquids which are to be filtered.

A further object of the invention is to provide a filtering element formed from a thoroughly degreased comparatively thick textile fabric thereby providing for more permeable and truly filtering, for utilizing a great deal of the capillary force in filtering, and economizing as a result a great part of the pressure force or mechanical suction commonly used in industrial filtering.

Further objects of the invention are to provide, a filtering element of the type referred to which is strong, durable, unusually efficient for the purpose intended therefor and comparatively inexpensive.

To the above ends essentially, and to others which may hereinafter appear, the invention consists in a form of filtering element which falls within the scope of the invention as claimed.

The drawing illustrates in perspective a filtering element formed of textile fabric and in accordance with this invention.

The filtering element indicated at 1, is constructed of a thoroughly degreased piece of textile fabric, preferably thick cotton cloth, such as duck or canvas, twills, drills, chain and other weaves used in industrial filtering. The degreasing may be effected on the cloth after the latter has been woven, or else directly on the threads, or on the cotton in the raw state, which are to be utilized in the manufacture of the cloth so as to obtain by either way a thoroughly degreased cloth for industrial filtering purposes. The thoroughly degreasing of the cloth or the threads or the cotton in the raw state from which the cloth is manufactured can be accomplished in any suitable manner.

A thoroughly degreased filtering element formed from textile fabric, in accordance with this invention, obtains a filtering element or medium possessing perfectly permeable and filtering characteristics, as well as further possessing the quality of quickly and easily absorbing the liquids which are to be filtered. A filtering element in accordance with this invention, utilizes a great deal of capillary force in filtering and economizing as a result a greater part of the pressure force or mechanical suction commonly used in industrial filtering.

In filtering any material through a filtering element of cloth, in accordance with this invention, advantage is taken of the law of capillarity which helps highly the through passage of the liquids, making a satisfactory clarification and complete separation of the solids, rendering the operation of filtering more efficient in less time and therefore cheaper.

Industrial filtering has found very great difficulties in obtaining apparatus or materials to effect a very efficient filtration on account of a fact which has been overlooked that the material provided principally, as regards cotton cloth, was not permeable but contrarily, on account of the closeness of the weave in the ducks, the pressure used for passing the liquids through its interstices caused great difficulties in the operation owing to the solid part being pressed on one side of the cloth and this would tend to clog very soon the interstices and would produce meagre results in efficiency and yield; and when twill cloth or thinner cloth were employed, the clarification, or perfect separation of the solids from the liquids was not entirely right and would not produce a perfect and efficient work.

Contrariwise the filtering accomplished with the improved filtering cloth, in accordance with this invention, will enable the industrial filtering process to come to a satisfactory issue, as then the operation of filtering, will be really so, and not simply sieving through the material reached through mechanical power; which power if used in filtering with this improved filtering cloth shall be reduced to a minimum and the efficient results will be increased to a maximum.

What I claim is:—

1. A filtering element comprising a thoroughly degreased woven fabric body of readily permeable vegetable fibres so as to offer thereby a minimum of resistance to the passage or flow through said fibres of a fluid to be filtered by said element.

2. A filtering element comprising a woven fabric body formed of vegetable fibres, said fibres being thoroughly degreased, said fibres and the body provided by the latter being readily permeable and offering a minimum of resistance to the flow through said element of a fluid to be filtered thereby.

3. A filtering element consisting of thoroughly degreased readily permeable vegetable fibres possessing maximum capillary attraction and arranged in the form of a fabric body, said fibres and said body offering a minimum of resistance to the flow through said element of a fluid to be filtered thereby.

JESUS de la TORRE.